(12) United States Patent
Emery

(10) Patent No.: US 9,697,434 B2
(45) Date of Patent: Jul. 4, 2017

(54) EDGE DETECTION SYSTEM AND METHODS

(71) Applicant: OmniVision Technologies, Inc., Santa Clara, CA (US)

(72) Inventor: Robbert Emery, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 156 days.

(21) Appl. No.: 14/566,308

(22) Filed: Dec. 10, 2014

(65) Prior Publication Data

US 2016/0171710 A1    Jun. 16, 2016

(51) Int. Cl.
*G06K 9/46*    (2006.01)
*G06T 7/12*    (2017.01)
*G06T 7/181*    (2017.01)

(52) U.S. Cl.
CPC .............. *G06K 9/4609* (2013.01); *G06T 7/12* (2017.01); *G06T 7/181* (2017.01); *G06T 2207/10024* (2013.01)

(58) Field of Classification Search
None
See application file for complete search history.

(56) References Cited

U.S. PATENT DOCUMENTS

| | | | |
|---|---|---|---|
| 9,082,338 B2* | 7/2015 | Yaras | G09G 3/2037 |
| 2003/0158470 A1* | 8/2003 | Wolters | A61B 1/043 |
| | | | 600/317 |
| 2006/0038879 A1* | 2/2006 | Kremen | H04N 13/0029 |
| | | | 348/51 |
| 2006/0044427 A1* | 3/2006 | Hu | H04N 9/07 |
| | | | 348/266 |
| 2007/0024931 A1* | 2/2007 | Compton | H04N 9/045 |
| | | | 358/512 |
| 2008/0240601 A1* | 10/2008 | Adams, Jr. | G06T 3/4015 |
| | | | 382/266 |
| 2009/0009654 A1* | 1/2009 | Imai | H04N 9/045 |
| | | | 348/360 |
| 2009/0065679 A1* | 3/2009 | Tanimoto | H04N 5/33 |
| | | | 250/208.1 |
| 2011/0069315 A1* | 3/2011 | He | G01J 3/28 |
| | | | 356/425 |
| 2012/0020555 A1* | 1/2012 | Lim | G06T 3/4053 |
| | | | 382/165 |
| 2014/0125815 A1* | 5/2014 | Holz | H04N 5/217 |
| | | | 348/169 |

* cited by examiner

*Primary Examiner* — Delomia L Gilliard
(74) *Attorney, Agent, or Firm* — Lathrop & Gage LLP

(57) ABSTRACT

An edge detection method includes reading at least a portion of wide-band pixel signals generated by wide-band pixels of an image sensor. The image sensor also includes narrow-band pixels that generate narrow-band pixel signals that remain unread. The method also includes sending the wide-band pixel signals to an image signal processor, forming a partially-filled reference image based on data from the wide-band pixel signals; and applying an edge-forming technique to the partially-filled reference image to produce an edge map. An edge detection system includes a two-dimensional array of pixels having wide-band pixels and narrow-band pixels, an image signal processor for producing an edge map from a partially-filled reference image, and a readout circuit for generating the partially-filled reference image for the image signal processor. The partially-filled reference is based only on at least part of the wide-band pixels.

20 Claims, 9 Drawing Sheets

360

EDGE DETECTION SYSTEM AND METHODS

BACKGROUND

Edge detection based on edge mapping, i.e., mapping out the edges of objects in an image by using image data obtained with an image sensor, is used in a variety of applications, such as autofocusing and movement detection. One way to produce an edge map is to first obtain image data with an image sensor that includes color (red, green, and blue) and panchromatic (clear or white) pixels, and then generate a reference panchromatic image in response to the captured panchromatic pixel signals. For a position in this image that is occupied by a panchromatic pixel, the captured panchromatic signal for that pixel is readily used. For a position that is occupied by a color pixel, there is no captured panchromatic signal for that pixel, so nearby panchromatic pixels are interpolated to provide an estimated panchromatic value for that pixel position. As a result, every pixel position will have a panchromatic value, either captured or interpolated. Once the reference panchromatic image is generated, an edge map is produced by applying edge-forming techniques such as digital filtration.

SUMMARY OF THE INVENTION

In an embodiment, an edge detection method includes reading at least a portion of wide-band pixel signals generated by wide-band pixels of an image sensor. The image sensor also includes narrow-band pixels that generate narrow-band pixel signals that remain unread. The method also includes sending the wide-band pixel signals to an image signal processor, forming a partially-filled reference image based on data from the wide-band pixel signals; and applying an edge-forming technique to the partially-filled reference image to produce an edge map.

In an embodiment, edge detection system includes a two-dimensional array of pixels having wide-band pixels and narrow-band pixels, an image signal processor for producing an edge map from a partially-filled reference image, and a readout circuit for generating the partially-filled reference image for the image signal processor. The partially-filled reference is based only on at least part of the wide-band pixels.

BRIEF DESCRIPTION OF THE FIGURES

FIG. 1A shows a diagram showing an embodiment of an image sensor with pixel array.

DETAILED DESCRIPTION

Figure 1B:
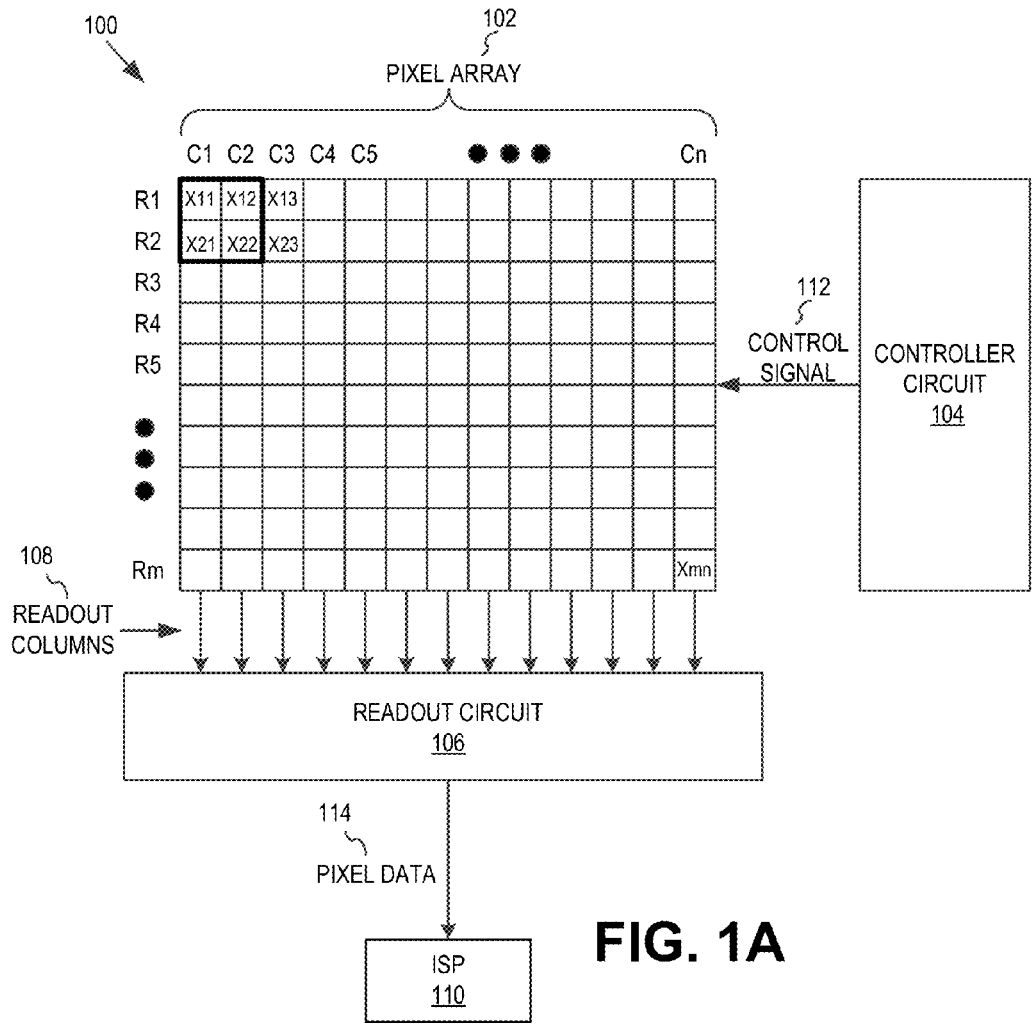
FIG. 1B shows an embodiment of a minimal repeating unit of a pixel array.

Embodiments disclosed below generate an edge map from an image taken by an image sensor wherein the image includes panchromatic and/or color pixel values. Particular embodiments relate to edge map generation by (a) skipping color and/or panchromatic pixels to produce a partial reference panchromatic image and/or by (b) truncating panchromatic pixel value based on level of illumination; these pixel skipping and/or pixel value truncation methods may speed up the rate of edge detection based on edge map generation.

FIG. 1A is a diagram illustrating an example of an image sensor 100 in accordance with the teachings of the present disclosure. In particular, image sensor 100 includes a pixel array 102 having a plurality of pixels labeled X11, X12, X13, X21, X22, X23 . . . Xmn. In the example of FIG. 1A, the pixels of pixel array 102 are organized in columns C1, C2, C3 . . . . Cn and rows R1, R2, R3 . . . Rm. Accordingly, pixel X11 is located at row 1, column 1; pixel X12 is located at row 1, column 2; and so on.

As shown in the depicted example of FIG. 1A, a readout circuit 106 and a controller circuit 104 couple to pixel array 102. Controller circuit 104 may then control pixel array 102 via a control signal 112 that includes a plurality of signals used to individually control circuitry of each pixel, row, and/or column of pixel array 102. Imaging pixel signals captured by pixels $X_{11}$, $X_{12}$, $X_{13}$, $X_{21}$, $X_{22}$, $X_{23}$ . . . $X_{mn}$ in pixel array 102 may be read out to readout circuit 106 through readout columns 108. Pixel data 114 are then sent to an image signal processor (ISP) 110 for data processing. ISP 110 includes requisite data processing hardware and software to perform edge detection based on edge map generation, as now disclosed.

Figure 1B:
Figure 1C:
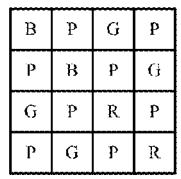
FIG. 1C shows an embodiment of an alternative minimal repeating unit of a pixel array.

Pixel array 102 is for example a two-dimensional array of pixels with a first group of pixels including color pixels, such as red, green, and blue, and a second group of pixels that includes panchromatic pixels; color pixels within the first group have narrower spectral photoresponses than panchromatic pixels within the second group. In one embodiment, pixel array 102 includes pixels forming a minimal repeating unit; the minimal repeating unit contains a minimal number of pixels serving to repeat itself as a building block for the entire pixel array 102. For example, four pixels $X_{11}$, $X_{12}$, $X_{21}$, and $X_{22}$ may form a minimal repeating unit that includes red (R), green (G), blue (B), and panchromatic (P) pixels, respectively, wherein the panchromatic pixel makes up 25% of the pixels in the minimal repeating unit, such as shown in FIG. 1B. Another example of a minimal repeating unit is a sixteen-pixel unit, wherein panchromatic pixels make up 50% of the minimal repeating unit, such as shown in FIG. 1C. A minimal repeating unit may be polychromatic, for example having different combinations of pixel color types such as R, G, B, yellow (Y), cyan (C), magenta (M), and panchromatic pixels; or it may be monochromatic, for example having only one pixel color type such as panchromatic. Although the pixels illustrated in FIGS. 1A, 1B, and 1C are shown as squares, the pixels may have other geometric shapes such as rectangles, hexagons, octagons, polygons, circles, ellipses, symmetrical shapes, non-symmetrical shapes, etc. The size of pixels may vary too, for example 1.1 μm, 1.4 μm, 1.75 μm, 10 μm, submicron, etc. Permutations and combinations of color and panchromatic pixels having various shapes and sizes yield a multitude of minimal repeating units, which vary in size, geometric shape, and pixel arrangement. These minimal repeating units are not exhaustively listed herein, but are nonetheless included within the scope of the present disclosure.

Figure 2:
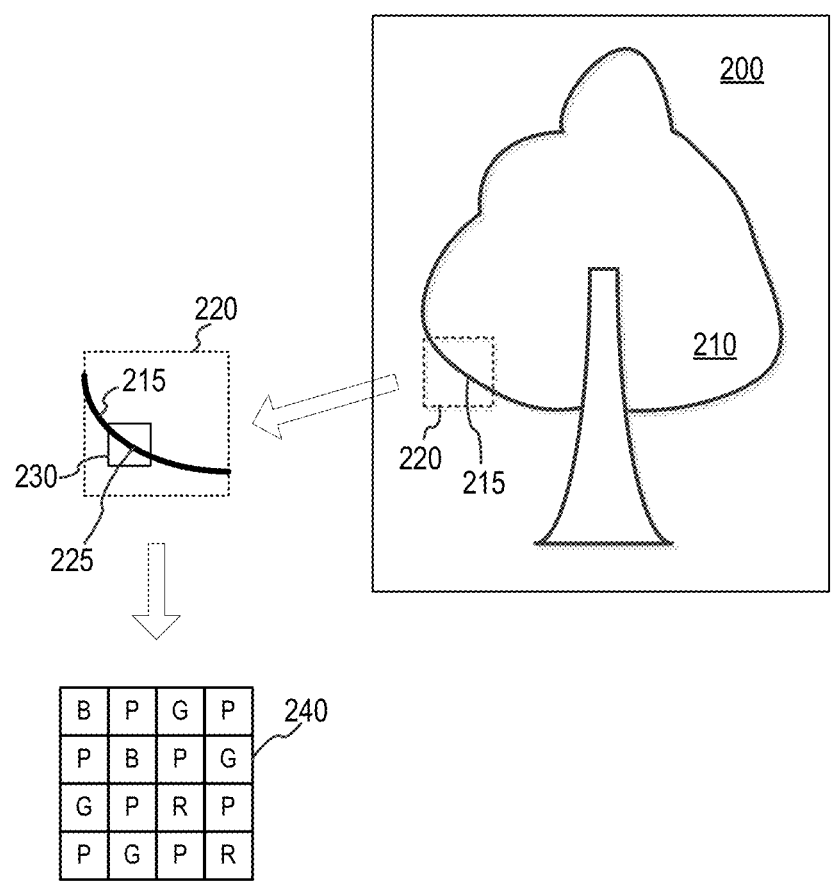
FIG. 2 diagrammatically illustrates varying magnification levels of image and imaging blocks, in an embodiment.

FIG. 2 diagrammatically illustrates varying magnification levels of image and imaging blocks. In the example of FIG. 2, at the unmagnified level, image 200 includes a tree object 210. A first local leaf portion 215 of the tree object 210 may be magnified in a first magnification level imaging block 220, such as shown. Higher magnification levels may be obtained, such as a second magnification level imaging block 230 in which a second local leaf portion 225 (contained within first local leaf portion 215) may be magnified. Further levels of magnification may be similarly obtained, wherein the highest level of magnification is a pixel level magnification block 240 that contains individual pixels such as R, G, B, and P as shown in FIG. 2. An image may be constructed using pixel data obtained from each of these pixels.

Figure 3A:
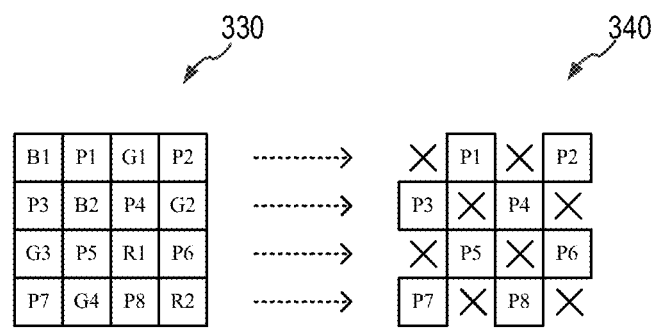
FIG. 3A is a diagram showing an embodiment of generating a panchromatic imaging block by skipping color pixels.

In one embodiment, a panchromatic image (alternatively termed a "reference panchromatic image" or "reference image") is produced and used for edge detection based on edge map generation. A panchromatic image is monochromatic and contains less data than a polychromatic image (for example formed of R, G, and B pixels). Therefore, the computation involved in edge map generation of a panchromatic image is generally faster than that of a polychromatic image. FIG. 3A shows a diagram wherein a panchromatic imaging block is generated by skipping color pixels. More specifically, a first imaging block 330 comprises a 4×4 square pixel arrangement that includes eight panchromatic pixels P1, P2 . . . P8; two blue pixels R1 and R2; four green pixels G1, G2, G3, and G4; and two red pixels R1 and R2. First imaging block 330 may or may not be a minimal repeating unit in a larger pixel array. During readout of pixel data, only panchromatic pixels are read out, as shown by positions marked P1, P2 . . . P8 in a second imaging block 340. Color pixels are skipped entirely, as shown by positions marked "x" in second imaging block 340; these pixel positions are thus devoid of pixel data. The spacing of color pixel skipping may be regular, due to the regular spacing arrangement of color pixels; though the scope of this disclosure includes irregular spacing color pixel spacing arrangements.

Figure 3B:
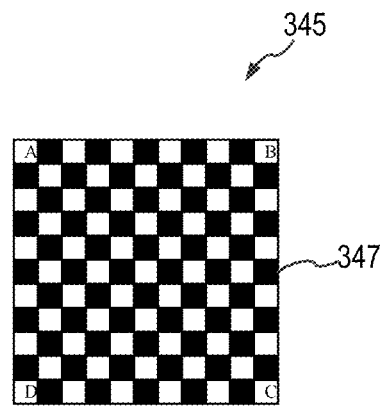
FIG. 3B is a diagram showing a panchromatic imaging block generated by skipping color pixels, in an embodiment.

Several approaches may produce a panchromatic image from second imaging block 340. In a first example, since positions marked by "x" do not have panchromatic pixel data, they may be computed by interpolating nearby, already existing panchromatic pixel data. This first example generates a full panchromatic image that includes pixel data for all pixel positions; but it is relatively slow to process because it requires interpolation through a number of computation steps. In a second example, positions marked by "x" are simply left undisturbed, such that only existing panchromatic pixel data in pixels P1, P2 . . . P8 are used. No interpolation is performed in the second example and resulting imaging block 345 is partially-filled, as shown in FIG. 3B and resembling a checkerboard. More specifically, imaging block 345 is bounded by four pixel positions A, B, C, and D, with dark pixels positions 347 seen within imaging block 345 (for purposes of clarity, only one dark pixel position is marked 347). Dark pixel positions 347 lack imaging data and are not part of the panchromatic image.

Figure 3C:
FIG. 3C is an embodiment of an interpolation-generated panchromatic image that includes panchromatic value at every pixel.
Figure 3D:
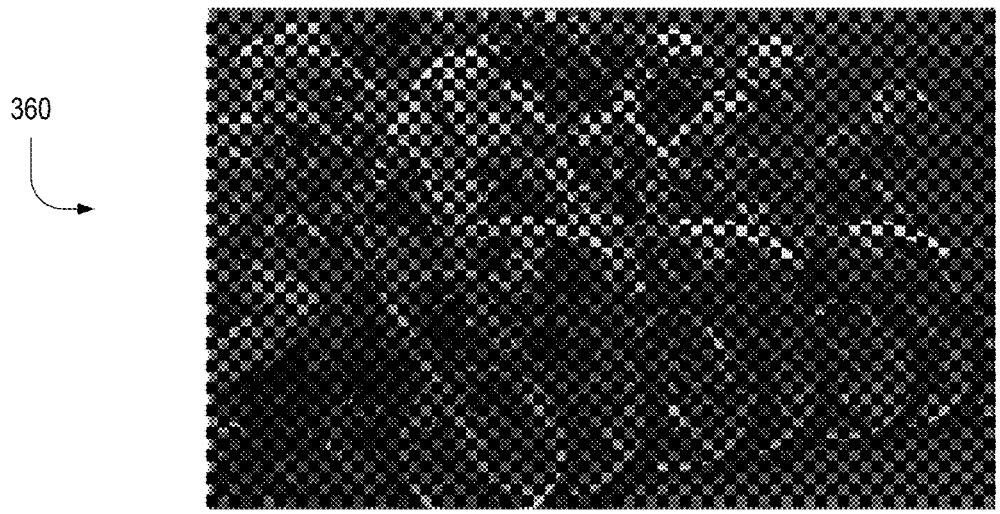
FIG. 3D is an embodiment of a pixel-skipping-generated panchromatic image that includes only pixels with captured panchromatic signals.

By viewing FIG. 3C and FIG. 3D together, a contrast is seen between a panchromatic image obtained with the first example (FIG. 3C) and a partially-filled panchromatic image 360 obtained with the second example (FIG. 3D). Partially-filled panchromatic image 360 may also be termed a "partially-filled reference image." It is appreciated that the second example (FIG. 3D) resembles a checkerboard since the image is partially-filled and contains less information than the full image of the first example (FIG. 3C). It is further appreciated that for illustrative purposes, the size of each black square of FIG. 3D is larger than an actual pixel size; typically, the size of an image sensor pixel has a range of about 1-10 μm, which is considerably smaller than the pixels shown in FIG. 3D. Since the second example (FIG. 3D) does not include pixel data interpolation, it may generate a partial panchromatic image at faster speed, which is desirable in edge map generation; however, the image resolution is less than that of a full panchromatic image.

Figure 4A:
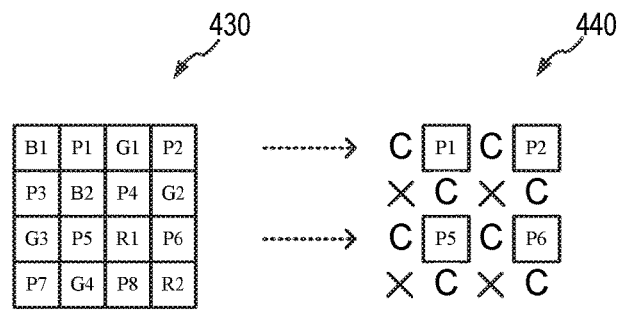
FIG. 4A is a diagram showing generation of a panchromatic imaging block by skipping color and panchromatic pixels, in an embodiment.

In addition to skipping color pixels, certain panchromatic pixels may also be skipped to produce the panchromatic image. FIG. 4A illustrates generating a panchromatic imaging block by skipping color and panchromatic pixels. More specifically, a first imaging block 430 comprises a 4×4 square pixel arrangement that includes eight panchromatic pixels P1, P2 . . . P8; two blue pixels R1 and R2; four green pixels G1, G2, G3, and G4; and two red pixels R1 and R2. First imaging block 430 may or may not be a minimal repeating unit in a larger pixel array. During readout of pixel data, color pixels are entirely skipped, as shown by some positions marked c in a third imaging block 440. In addition, some panchromatic pixels are also skipped, as shown by other positions marked "x" in third imaging block 440. Other panchromatic pixels are read out. In the embodiment of FIG. 4A, therefore, panchromatic pixels P3, P4, P7, and P8 are skipped, whereas panchromatic pixels P1, P2, P5, and P6 are read out. The spacing of color pixel skipping may be regular, due to the regular spacing arrangement of color pixels. The spacing of panchromatic pixel skipping may or may not be regular. In FIG. 4A, the skipping spacing is illustratively regular as the panchromatic pixel readout is skipped every other row. After reading out P1 and P2 in the first row in first imaging block 430, P3 and P4 in the second row are skipped. Then, P5 and P6 in the third row are read out, followed by skipping of the fourth row. The skipping spacing may also be irregular but yields an imaging block with irregularly spaced pixels.

Figure 4B:
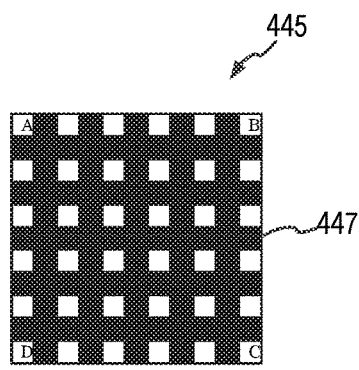
FIG. 4B is an embodiment of pixel-skipping-generated panchromatic imaging block produced by skipping color and panchromatic pixels.

FIG. 4B illustrates partial panchromatic imaging by skipping color and panchromatic pixels, wherein a resulting imaging block 445 is partially-filled, as shown. More specifically, imaging block 445 is bounded by four pixel positions A, B, C, and D, with pixels that are regularly spaced in rows and columns, skipping every other row and every other column. Dark pixels positions 447 seen within imaging block 445 lack imaging data and are not part of the partial panchromatic image. And, similar to the second example of FIG. 3B, no interpolation of nearby panchromatic pixel signals is performed. Comparing partial imaging block 345 of FIG. 3B with partial imaging block 445 of FIG. 4B shows that partial imaging block 445 is more sparsely populated by pixels with data. This results in a further reduction in image resolution, but is desirable for speeding up pixel data processing for edge map generation.

Figure 4C:
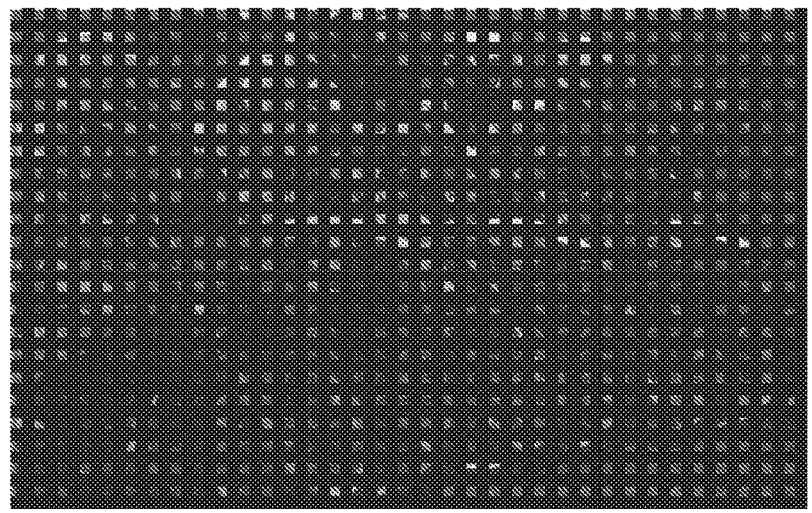
FIG. 4C is an embodiment of a pixel-skipping-generated panchromatic imaging block generated by skipping color and panchromatic pixels.

FIG. 4C is an embodiment of a pixel-skipping-generated partial panchromatic imaging block 449 produced by skipping color and panchromatic pixels generated as by FIG. 4A. It is appreciated that FIG. 4C contains even less information than FIG. 3D. It is further appreciated that for illustrative purposes, the size of each black square of FIG. 4C is larger than an actual pixel size; typically, the size of an image sensor pixel has a range of about 1-10 μm, which is considerably smaller than the pixels shown in FIG. 4C. Similar to the second example described in connection with FIG. 3D, no pixel data interpolation is performed in generating the partial panchromatic image of FIG. 4C. The partial panchromatic image in FIG. 4C is thus generated at an even faster speed than the image of FIG. 3D because the image in FIG. 4C includes fewer pixels with data. This again is desirable in fast edge map generation, even though image resolution of FIG. 4C is reduced as compared to FIG. 3D.

Accordingly, edge recognition based on edge map generation may be made faster by: (1) reading out all panchromatic pixel signals and skipping all color pixel signals; (2) reading out a portion of panchromatic pixel signals and skipping the remainder of the panchromatic pixel signals while skipping all color pixel signals; and/or (3) using the readout panchromatic pixel signals to construct a partially-filled reference panchromatic image with skipped pixel positions blank (i.e., without image data for skipped pixel positions). In scenarios (1), (2), and (3), readout circuit 106 (FIG. 1) performs the reading operation. Edge map generation may be made even faster based by truncating pixel values during or after pixel signal readout, as now described.

Figure 5A:
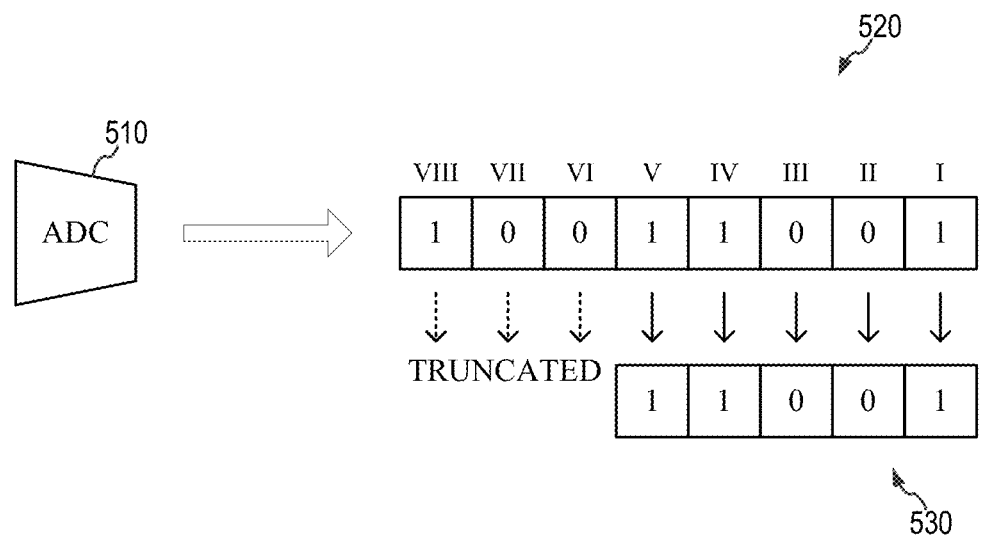
FIG. 5A is a diagram showing an embodiment of truncating panchromatic pixel value.

A panchromatic image is a grayscale image, which includes multiple shades of gray. Standard form of data output for an imaging pixel is an eight-bit format. More specifically, the panchromatic pixel signal is read out as a byte, i.e., a data unit that consists of several bits, e.g., 8-bit. FIG. 5A shows an output device (shown as an analog digital converter (ADC) 510) reading out a panchromatic pixel signal data unit 520 (a byte) from readout columns (not shown). Panchromatic pixel signal data unit 520 consists of eight bits as represented by Roman numerals I, II . . . VIII. The least significant bit I is situated at the rightmost position of data unit 520, whereas the most significant bit VIII is situated at the leftmost position of data unit 520. Each bit position holds a binary number, either 0 or 1. For this 8-bit data unit 520, there are 256 (i.e., $2^8$) possible values. Therefore, for a panchromatic image wherein its pixels are of an eight-bit data format, the grayscale of the image has 256 shades of gray.

Reducing bits of data per pixel results in a reduction of the shades of gray, as delineated in the following table. Note that an image with only two shades of gray means that the image is purely black and white.

| Bits per pixel | Shades of gray |
| --- | --- |
| 8 | 256 ($2^8$) |
| 7 | 128 ($2^7$) |
| 6 | 64 ($2^6$) |
| 5 | 32 ($2^5$) |
| 4 | 16 ($2^4$) |
| 3 | 8 ($2^3$) |
| 2 | 4 ($2^2$) |
| 1 | 2 ($2^1$) |

It may be appreciated that a reduction of the shades of gray by reducing data bits per pixel decreases the image quality of a panchromatic image. An excessive reduction in image quality makes it harder to perform edge recognition due to lack of imaging detail. Yet, a reduction of data bits per pixel speeds up data processing, and increases computational speed desirable for edge recognition based on edge map generation. Therefore, a balanced approach is used according to the teachings herein to reduce the data bits per pixel to speed up data processing while maintaining sufficient image quality to preserve the accuracy of edge recognition.

The degree to which data bits per pixel may be reduced is based on several factors, for example the illumination level for an image. For a relatively high level of illumination (e.g., 200 lux and above, typically encountered in bright indoor lighting), many details tend to be captured in an image. Therefore, even with a grayscale that is relatively small (e.g., sixteen shades of gray, corresponding to 4-bit pixel data format), edge recognition may still be performed with reasonable accuracy. When the level of illumination is relatively low (e.g., 10 lux or less, typically encountered in outdoors twilight condition), a relatively large grayscale (e.g., 256 shades of gray, corresponding to 8-bit pixel data format) may be needed to provide sufficient image quality for edge recognition with reasonable accuracy.

The following table provides an example in which the level of illumination determines the requisite of bits of data per pixel for the purpose of edge recognition.

| Level of illumination (lux) | Minimum requisite of bits per pixel |
| --- | --- |
| 200 and above | 4 |
| 100 | 6 |
| 10 | 8 |

Reduction of bits of data per pixel may be performed, for example, by pixel value truncation. In FIG. 5A, the 8-bit data unit 520 is truncated by reading out bits I, II, III, IV, and V, resulting in a 5-bit data unit 530, which is recorded in a register (not shown) for subsequent data processing. It is appreciated that while truncation of panchromatic pixel signal data from a higher bit format to a lower bit format may be performed by a pixel signal output device as part of the readout circuit, e.g., ADC 510, the truncation operation may be alternatively performed elsewhere. For example, the pixel signal may be fully read out in eight-bit format by ADC 510 into a register to be deposited in ISP 110, and then the truncation may be performed within ISP 110. Performing the truncation operation early on during the pixel signal data flow, e.g., by ADC 510, confers the benefit of speeding up the overall edge detection process because the quantity of pixel signal data is reduced early on during the pixel signal data flow.

In the present embodiment, bits VI, VII, and VIII are truncated, i.e., not included in the 5-bit data unit 530 that is recorded in the register. In other embodiments, bits other than VI, VII, and VIII may be truncated. For example, bits I, II, and III may be truncated. The truncated bits may be consecutively arranged, as disclosed above. They may alternatively be non-consecutively arranged. For example, bits I, II, and VIII may be truncated. In another example, bits III, IV, and VII may be truncated. More examples of truncation exist, and are not exhaustively disclosed herein, but are still within the scope of the disclosure. The panchromatic image that is produced with five bits of data per pixel has an image quality of 32 shades of gray. Without pixel value truncation, the panchromatic image would have the image quality of 256 shades of gray.

Figure 5B:
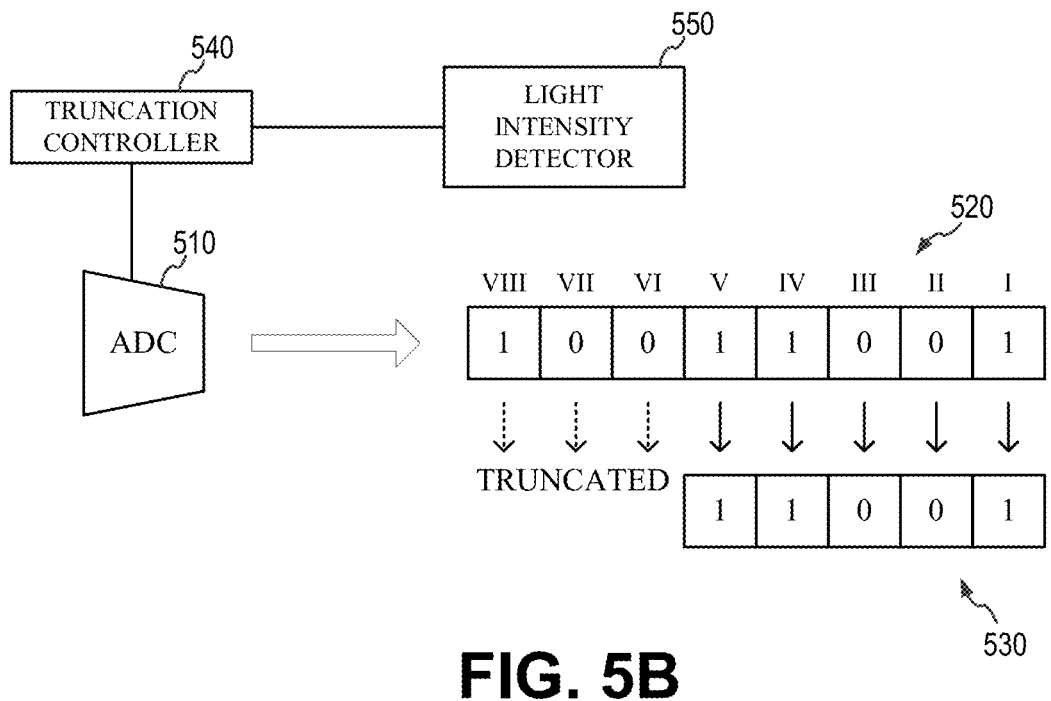
FIG. 5B is a diagram showing an embodiment of a device that truncates panchromatic pixel value based on light intensity level.

Based on the level of illumination, an appropriate form of pixel value truncation may be selected to produce a reference panchromatic image for further edge recognition based on edge map generation. FIG. 5B shows an example device that truncates panchromatic pixel value based on light intensity level. Specifically, a light intensity detector 550 (e.g., an ambient light sensor) detects the intensity level of light that acts upon an image sensor (not shown), and forwards the light intensity information to a truncation controller 540. Truncation controller 540 then directs ADC 510 to perform appropriate panchromatic pixel value truncation based on the light intensity level. For example, for 200 lux and above, the panchromatic pixel value is truncated to have a four-bit format. For approximately 100 lux, the panchromatic pixel value is truncated to have a six-bit format. For approximately 10 lux and below, the panchromatic pixel value is not truncated, i.e., it maintains an eight-bit format. If the truncation operation takes place inside an ISP (not shown), then truncation controller 540 is coupled with both the light intensity detector 550 and the ISP.

Once a reference panchromatic image is produced by using truncated panchromatic pixel values, an edge map may be produced by appropriate edge-forming techniques such as high-pass or directional filtering. High-pass filtering may be performed directly by convolving the reference panchromatic image with a high-pass filter in the form of a high-pass kernel, and taking the absolute value of the result as a high-pass frequency image. A high-pass kernel is a small array (matrix) applied to each pixel—referred to herein as an "initial pixel"—and its neighboring pixels that form a square with an odd number (e.g., 3, 5, 7, etc.) of elements in each dimension within an image. The process used to apply a filter/kernel to an image is known as convolution. The convolution process multiplies the elements of the kernel by their matching pixel values when the kernel is centered over the initial pixel. The elements of the resulting array, which is the same size as the kernel, are then summed or averaged, and the initial pixel value is replaced with this sum or average, or sometimes replaced with the absolute value of the sum or average.

An example of an appropriate high-pass kernel is:

$$\begin{bmatrix} -1 & -1 & -1 \\ -1 & 8 & -1 \\ -1 & -1 & -1 \end{bmatrix}.$$

Figure 6A:
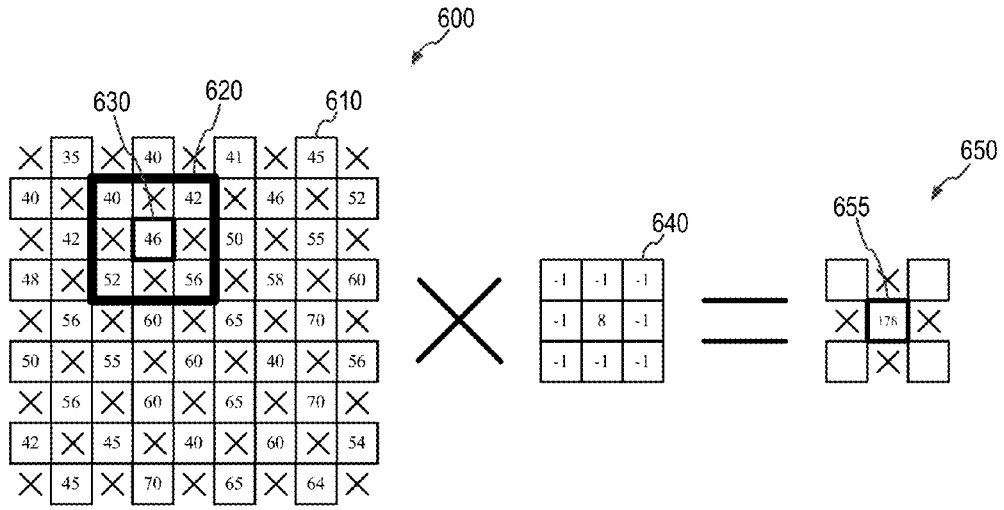
FIG. 6A is a diagram showing a convolution process wherein a high-pass filter kernel acts upon a kernel action area of a reference panchromatic image, in an embodiment.

FIG. 6A is an example of convolving part of a reference panchromatic image with a high-pass kernel. To illustrate, a portion of the reference panchromatic image is shown as an image matrix 600. Image matrix 600 is partially-filled, with each image pixel 610 marked with its pixel value (e.g., 45), and with dark pixel positions lacking imaging data marked with "x". A kernel action area 620 (illustratively bounded by a thick border) includes an initial pixel 630 at its center. Initial pixel 630 has four neighboring image pixel positions—top left, top right, bottom right, and bottom left—each with its own pixel value. The other four neighboring positions—top, right, bottom, and left—are dark pixel positions lacking imaging data. A high-pass kernel 640 acts upon the kernel action area 620. More specifically, the values of the initial pixel 630 and each of its neighboring pixels that have pixel data (top left, top right, bottom right, and bottom left) are multiplied by their corresponding elements in high-pass kernel 640, and then summed (or alternatively averaged). The neighboring dark pixel positions (top, right, bottom, and left) that lack pixel value are not acted upon by the high-pass kernel 640. The resulting convolved pixel value is 178, which is the sum (−1×40)+(−1×42)+(8×46)+(−1×52)+(−1×56). If the average value is used, then the resulting convolved value is the sum 178 divided by five, which is 35.6. The absolute value of this resulting value then replaces the initial pixel value 46. The convolving result is presented as a high-frequency imaging block 650, with a convolved pixel 655 at its center, and includes the convolved pixel value 178 (or 35.6 if the average value is used). The high-frequency image is a result of convolving all the pixels of the reference panchromatic image (less the pixels on the borders of the image) with the high-pass kernel, and is made up of pixels such as the convolved pixel 655.

High-pass filtering may alternatively be performed by unsharp masking. More specifically, the reference panchromatic image is first convolved with a low-pass kernel to produce a low-frequency image. Then, this low-frequency image is subtracted from the reference panchromatic image. The absolute value of this subtraction is taken as the alternatively produced high-frequency image.

An example of an appropriate low-pass kernel is:

$$\begin{bmatrix} 1 & 2 & 1 \\ 2 & 4 & 2 \\ 1 & 2 & 1 \end{bmatrix}.$$

Figure 6B:
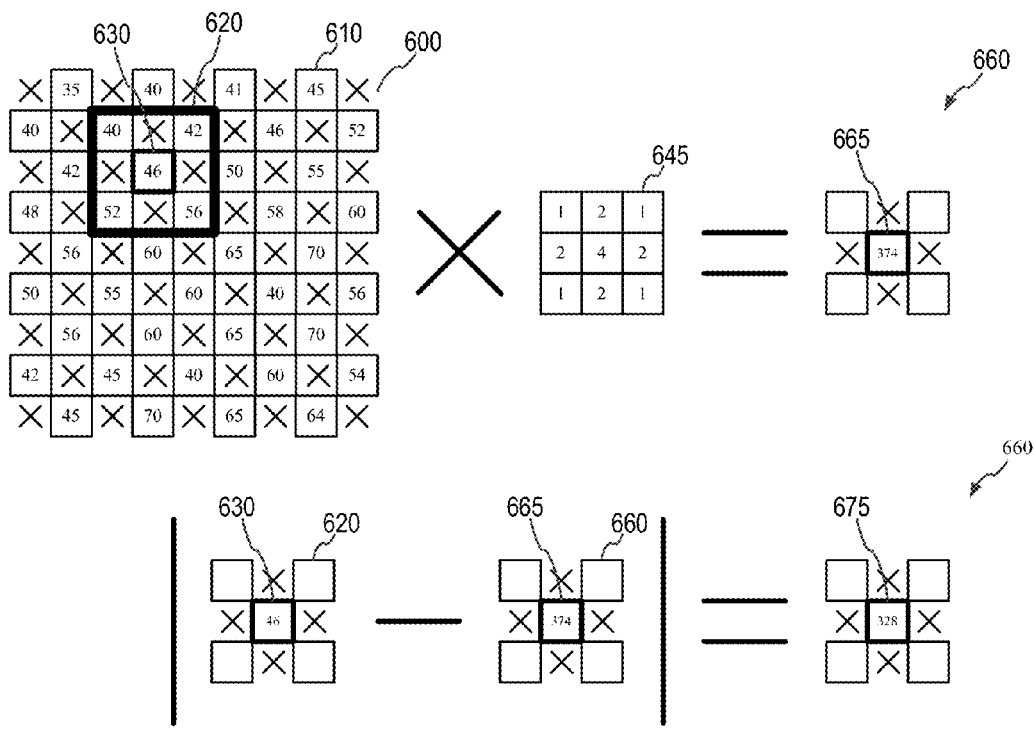
FIG. 6B is a diagram showing a convolution process wherein a low-pass filter kernel acts upon a kernel action area of a reference panchromatic image, in an embodiment.

FIG. 6B is an example of convolving part of a reference panchromatic image with a low-pass kernel. Low-pass kernel 645 is convolved with the kernel action area 620 that is centered on the initial pixel 630. The resulting low-frequency imaging block 660 includes a convolved block 665 at its center, which has a convolved value of 374, i.e., (1×40)+(1×42)+(4×46)+(1×52)+(1×56). If the average value is used, then the convolved value is the sum 374 divided by five, which is 74.8. This convolved value, either the sum or the average, is then subtracted from the initial pixel value, and the absolute value of the result, |46−374|=328, is taken as the pixel value of a center pixel 675 of an alternatively produced high-frequency imaging block 670, as shown in FIG. 6B. An alternatively produced high-frequency image is made up of pixels such as the center pixel 675.

The high-frequency image may be taken as an edge map. Alternatively, the edge map may be produced by taking the high-frequency image and applying thresholding. More specifically, each pixel value in the high-frequency image is tested against a given threshold value (e.g., 300). If the pixel value in the high-frequency image is equal to or greater than the given threshold value, then the corresponding pixel value in the edge map is marked as an edge pixel and set to a value that indicates the presence of an edge, e.g., one. If the pixel value in the high-frequency image is less than the given threshold value, then the corresponding pixel value in the edge map is marked as a flat pixel and set to a value that indicates the absence of an edge, e.g., zero.

Multiple thresholds may be used. For example, after producing a first edge map using a relatively large first threshold value (e.g., 300), a second edge map may be produced from the first edge map and the high-frequency image using a smaller second threshold value (e.g., 250). In this case, each pixel location in a first edge map marked as an edge pixel is automatically marked as an edge pixel in a second edge map at the corresponding location. In the case of a pixel location in the first edge map being marked as a flat pixel, with at least one of the adjacent pixel locations being marked as an edge pixel, the corresponding high-frequency image pixel value is compared to the second threshold value. If the pixel value in the high-frequency image is equal to or greater than the second threshold value, the corresponding pixel value in the second edge map is re-marked as an edge pixel. If the pixel value in the high-frequency image is less than the second threshold value, the corresponding pixel value in the second edge map remains marked as a flat pixel. It will be clear to one skilled in the art that this process may be continued using additional thresholds (e.g., 200, 150, etc.).

Directional filtering is an alternative edge-forming technique. It is used to produce an edge map by computing first derivatives of an image. Since an edge within an image is visible when a large change (i.e., a steep gradient) occurs between adjacent pixel values, this change in values may be measured by the first derivatives (i.e., slopes) of an image, and taken as the presence of the edge. Directional filtering may be performed by convolving the reference panchromatic image with x and y directional filter kernels to produce x and y directionally filtered images. In some embodiments, the x and y directionally filtered images may be averaged to produce a comprehensive edge map.

In an embodiment, an x-direction filter kernel $M_x$ is convolved with a reference panchromatic image in a way that is similar to high-pass kernel convolution discussed above. More specifically, the x-direction filter kernel $M_x$ is centered on a kernel action array A with an initial pixel at its center. The convolution process multiplies the elements of the kernel $M_x$ by matching them to corresponding pixel values in the kernel action array A. The elements of the resulting array $G_x = M_x * A$, where $G_x$ is the same size as the kernel $M_x$, are then summed or averaged, and the initial pixel value is replaced with this sum or average or sometimes replaced with the absolute value of the sum or average.

Examples of x-direction filter kernel $M_x$ include:

$$M_x = \begin{bmatrix} -1 & 0 & 1 \\ -2 & 0 & 2 \\ -1 & 0 & 1 \end{bmatrix}; \text{ or}$$

$$M_x = \begin{bmatrix} -1 & 0 & 1 \\ -1 & 0 & 1 \\ -1 & 0 & 1 \end{bmatrix}.$$

Similarly in another embodiment, a y-direction filter kernel $M_y$ is applied to the kernel action array A with the initial pixel at its center. The elements of resulting array $G_y = M_y * A$, where $G_y$ is the same size as the kernel $M_y$, are then summed or averaged, and the initial pixel value is replaced with this sum or average, or sometimes replaced with the absolute value of the sum or average.

Examples of y-direction filter kernel $M_y$ include:

$$M_y = \begin{bmatrix} -1 & -2 & -1 \\ 0 & 0 & 0 \\ 1 & 2 & 1 \end{bmatrix}; \text{ or}$$

$$M_y = \begin{bmatrix} -1 & -1 & -1 \\ 0 & 0 & 0 \\ 1 & 1 & 1 \end{bmatrix}.$$

In another embodiment, arrays $G_x$ and $G_y$ may be averaged to produce a comprehensive array G, e.g., $G = \sqrt{G_x^2 + G_y^2}$. The elements of the comprehensive array G are then summed or averaged, and the initial pixel value is replaced with this sum or average, or sometimes replaced with the absolute value of the sum or average.

Other directional filtering techniques may be applied. In one example, a Laplacian filter kernel L is applied to a kernel action area A in order to compute the second derivatives of an image, which measure the rate at which the first derivatives change. This helps to determine if a change in adjacent pixel values is an edge or a continuous progression. The Laplacian convolution method is similar to other kernel convolution methods as disclosed above. More specifically, the Laplacian filter kernel L is applied to the kernel action array A with the initial pixel at its center. $G_L = L * A$. The elements of resulting array $G_L$ are then summed or averaged, and the initial pixel value is replaced with this sum or average, or sometimes replaced with the absolute value of the sum or average.

Kernels of Laplacian filters usually contain negative values in a cross pattern (similar to a plus sign), which is centered within the array. The corners are either zero or positive values. The center value can be either negative or positive. An example of a Laplacian filter kernel L may be:

$$L = \begin{bmatrix} 0 & -1 & 0 \\ -1 & 4 & -1 \\ 0 & -1 & 0 \end{bmatrix}.$$

Figure 7A:
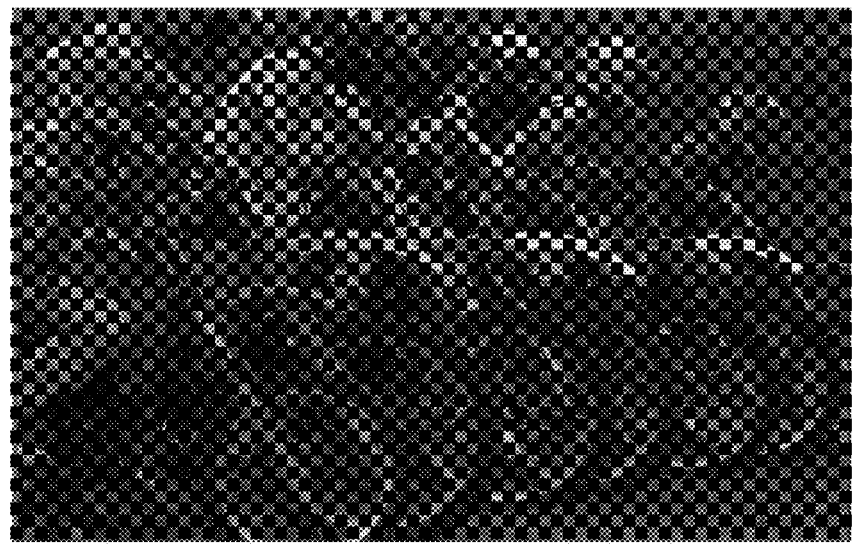
FIG. 7A is an embodiment of a reference panchromatic image used for edge map generation.
Figure 7B:
FIG. 7B is an embodiment of an edge map based on the reference panchromatic image.

FIG. 7A is an example of a partially-filled reference panchromatic image that is to be subjected to edge-forming techniques. The partially-filled reference panchromatic image of FIG. 7A is produced such as by pixel skipping and pixel value truncation discussed above. FIG. 7B is an example of an edge map produced by applying edge-forming to the reference panchromatic image in FIG. 7A.

Figure 8:
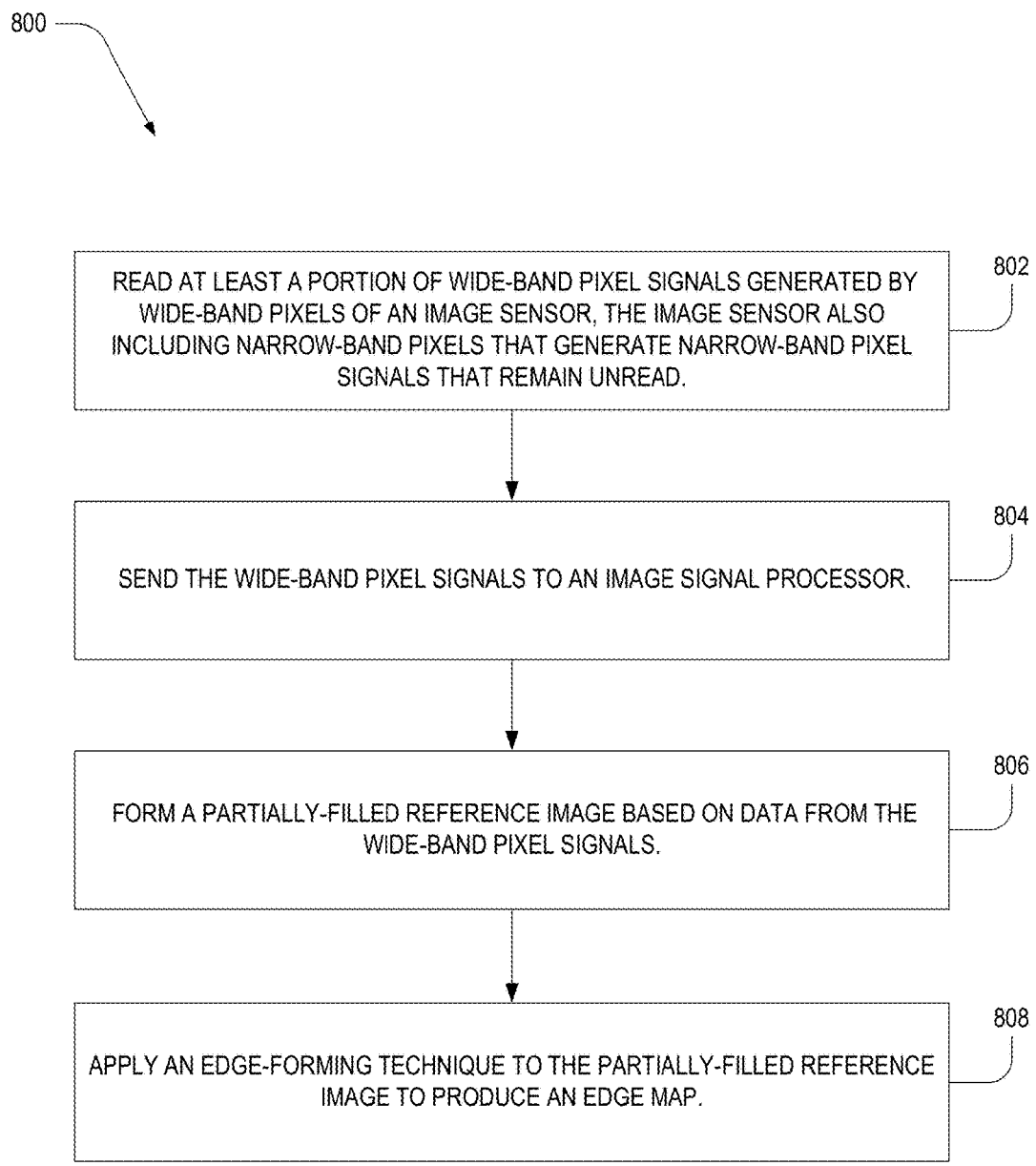
FIG. 8 is a flow chart illustrating an edge detection method based on edge mapping, in an embodiment.

FIG. 8 is a flow chart illustrating an edge detection method 800 based on edge mapping. In step 802, method 800 reads at least a portion of wide-band pixel signals generated by wide-band pixels of an image sensor. The image sensor also includes narrow-band pixels that generate narrow-band pixel signals that remain unread. In an example of step 802, method 800 method 800 reads at least a portion of wide-band pixel signals, represented by pixel data 114, generated by wide-band pixels of image sensor 100. Wide-band pixels of image sensor 100 include pixels $X_{ij}$ that are panchromatic pixels labelled "P" in FIGS. 1B and 1C, where i and j are integers satisfying $1 \le i \le m$ and $1 \le j \le n$. Narrow-band pixels of image sensor 100 include pixels $X_{kl}$ that are color pixels labelled one of "R," "B," "G," "C," "M,", and "Y" in FIGS. 1B and 1C and accompanying text, where k and l are integers satisfying $1 \le k \le m$ and $1 \le l \le n$.

In step 804, method 800 sends the wide-band pixel signals to an image signal processor. In an example of step 804, method 800 sends the wide-band pixel signals, represented by pixel data 114, to ISP 110 of FIG. 1.

In step 806, method 800 forms a partially-filled reference image based on data from the wide-band pixel signals. In an example of step 806, method 800 forms partially-filled panchromatic image 360 based on pixel data 114.

In step 808, method 800 applies an edge-forming technique to the partially-filled reference image to produce an edge map. In an example of step 808, method 800 applies an high-pass filtering using high-pass kernel 640 to the partially-filled reference image to produce an edge map. In an example of step 808, method 800 applies low-pass filtering using low-pass kernel 645 to the partially-filled reference image to produce an edge map. In an example of step 808, method 800 applies directional filtering using one or more of directional filter kernels $M_x$ and $M_y$ to the partially-filled reference image to produce an edge map.

Combinations of Features

Features described above as well as those claimed below may be combined in various ways without departing from the scope hereof. For example, it will be appreciated that aspects of an edge detection method described herein may incorporate or swap features of another edge detection method described herein. Similarly, aspects of an edge detection system described herein may incorporate or swap features of another edge detection system described herein. The following examples illustrate possible, non-limiting combinations of embodiments described above. It should be clear that many other changes and modifications may be made to the methods and device herein without departing from the spirit and scope of this invention.

(A1) An edge detection method includes reading at least a portion of wide-band pixel signals generated by wide-band pixels of an image sensor, the image sensor also including narrow-band pixels that generate narrow-band pixel signals that remain unread. The method also includes sending the wide-band pixel signals to an image signal processor, forming a partially-filled reference image based on data from the wide-band pixel signals, and applying an edge-forming technique to the partially-filled reference image to produce an edge map.

(A2) In the edge detection method denoted as (A1), the step of reading may include reading all of wide-band pixel signals generated by wide-band pixels of an image sensor.

(A3) In one or both of the edge detection method denoted as (A1) and (A2), the method may further include truncating the wide-band pixel signals.

(A4) In the edge detection method denoted as (A3), the step of truncating may include converting pixel signals from an eight-bit format to a format that is less than or equal to eight-bit, depending on light intensity levels acting upon an image capture system generating the wide-band and narrow-band pixel signals.

(A5) In one or both of the edge detection method denoted as (A3) and (A4), the step of truncating may include converting pixel signals from the eight-bit format to a four-bit format when light intensity level acting upon an image capture system generating the wide-band and narrow-band pixel signals is greater than or equal to approximately 200 lux.

(A6) In any of the edge detection method denoted as (A3) through (A5), the step of truncating may include converting pixel signals from the eight-bit format to a six-bit format when light intensity level acting upon an image capture system generating the wide-band and narrow-band pixel signals is approximately 100 lux.

(A7) In any of the edge detection method denoted as (A3) through (A6), the step of truncating may include maintaining the wide-band pixel signals at the eight-bit format when light intensity level acting upon an image capture system generating the wide-band and narrow-band pixel signals is less than or equal to 10 lux.

(A8) In any of the edge detection method denoted as (A1) through (A7), the step of applying an edge-forming technique may include applying a high-pass filtering step to the partially-filled reference image.

(A9) In any of the edge detection method denoted as (A1) through (A8), the step of applying an edge-forming technique may include applying a directional filtering step to the partially-filled reference image.

(A10) In any of the edge detection method denoted as (A1) through (A9), the wide-band pixels may be panchromatic pixels, each narrow-band pixel being a color pixel, and the narrow-band pixels including at least two pixels of a different color type.

(B1) An edge detection system includes a two-dimensional array of pixels having wide-band pixels and narrow-band pixels, an image signal processor for producing an edge map from a partially-filled reference image, and a readout circuit for generating the partially-filled reference image for the image signal processor and based only on at least part of the wide-band pixels.

(B2) In the edge detection system denoted as (B1), the readout circuit may be configured to read out all of the wide-band pixels to deposit pixel data into the image signal processor.

(B3) In one or both of the edge detection systems denoted as (B1) and (B2), the readout circuit may be configured to read out a portion of the wide-band pixels to deposit pixel data into the image signal processor, while skipping any remaining data from the wide-band pixels.

(B4) In any of the edge detection systems denoted as (B1) through (B3), the readout circuit may be configured to truncate data from the wide-band pixels for deposit into the image signal processor.

(B5) In an edge detection system denoted as (B4), the readout circuit may be configured to truncate the data from an eight-bit format to a format that is less than or equal to eight-bit, depending on light intensity level acting upon an image capture system having the two dimensional array of pixels.

(B6) In any of the edge detection systems denoted as (B1) through (B5), the image signal processor being may be configured to truncate data from the wide-band pixels.

(B7) In an edge detection system denoted as (B6), the image signal processor may be configured to truncate the data from an eight-bit format to a format that is less than or equal to eight-bit, depending on light intensity level acting upon an image capture system having the two dimensional array of pixels.

(B8) In any of the edge detection systems denoted as (B1) through (B7), the image signal processor may be configured to apply an edge-forming technique to the partially-filled reference image to produce the edge map by applying one of high-pass filtering and directional filtering to the partially-filled reference image.

(B9) In any of the edge detection systems denoted as (B1) through (B8), the wide-band pixels may be panchromatic pixels, each narrow-band pixel being a color pixel, and the narrow-band pixels including at least two pixels of a different color type.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. Edge detection method, comprising:
   reading, from an image sensor having (a) wide-band pixels generating wide-band pixel signals and (b) narrow-band pixels generating narrow-band pixel signals, at least a portion of the wide-band pixel signals;
   sending the wide-band pixel signals to an image signal processor;
   forming a partially-filled reference image based on data from the wide-band pixel signals and having image data only at locations corresponding to wide-band pixels; and
   applying an edge-forming technique to the partially-filled reference image to produce an edge map.

2. Edge detection method of claim 1, the step of reading comprising reading all of wide-band pixel signals generated by wide-band pixels of an image sensor.

3. Edge detection method of claim 1, in the step of reading, the wide-band pixel signals each having a bit depth M, and further comprising, before the step of sending, truncating the wide-band signals such that each wide-band pixel signal has a bit depth N<M.

4. Edge detection method of claim 3, the step of truncating comprising converting pixel signals from an eight-bit format to a format that is less than or equal to eight-bit, depending on light intensity levels acting upon an image capture system generating the wide-band and narrow-band pixel signals.

5. Edge detection method of claim 3, the step of truncating comprising converting pixel signals from the eight-bit format to a four-bit format when light intensity level acting upon an image capture system generating the wide-band and narrow-band pixel signals is greater than or equal to approximately 200 lux.

6. Edge detection method of claim 3, the step of truncating comprising converting pixel signals from the eight-bit format to a six-bit format when light intensity level acting upon an image capture system generating the wide-band and narrow-band pixel signals is approximately 100 lux.

7. Edge detection method of claim 3, the step of truncating comprising maintaining the wide-band pixel signals at the eight-bit format when light intensity level acting upon an image capture system generating the wide-band and narrow-band pixel signals is less than or equal to 10 lux.

8. Edge detection method of claim 1, the step of applying an edge-forming technique comprising applying at least one of a high-pass filtering step and a directional filtering step to the partially-filled reference image.

9. Edge detection method of claim 1, the wide-band pixels being panchromatic pixels, each narrow-band pixel being a color pixel, and the narrow-band pixels including at least two pixels of a different color type.

10. An edge detection system, comprising:
    a two-dimensional array of pixels having wide-band pixels and narrow-band pixels;
    an image signal processor configured to produce an edge map from a partially-filled reference image having image data only at locations corresponding to wide-band pixels; and
    a readout circuit configured to generate the partially-filled reference image for the image signal processor and based on at least part of the wide-band pixels.

11. The edge detection system of claim 10, wherein the readout circuit is configured to read out all of the wide-band pixels to deposit pixel data into the image signal processor.

12. The edge detection system of claim 10, wherein the readout circuit is configured to read out a portion of the wide-band pixels to deposit pixel data into the image signal processor, while skipping any remaining data from the wide-band pixels.

13. The edge detection system of claim 10, the readout circuit being configured to truncate data from the wide-band pixels, having a bit depth M, for deposit into the image signal processor as data having bit depth N<M.

14. The edge detection system of claim 13, the readout circuit being configured to truncate the data from an eight-bit format to a format that is less than or equal to eight-bit, depending on light intensity level acting upon an image capture system having the two dimensional array of pixels.

15. The edge detection system of claim 10, the image signal processor being configured to truncate data from the wide-band pixels.

16. The edge detection system of claim 15, the image signal processor being configured to truncate the data from an eight-bit format to a format that is less than or equal to eight-bit, depending on light intensity level acting upon an image capture system having the two dimensional array of pixels.

17. The edge detection system of claim 10, wherein the image signal processor is configured to apply an edge-forming technique to the partially-filled reference image to produce the edge map by applying one of high-pass filtering and directional filtering to the partially-filled reference image.

18. The edge detection system of claim 10, the wide-band pixels being panchromatic pixels, each narrow-band pixel being a color pixel, and the narrow-band pixels including at least two pixels of a different color type.

19. Edge detection method of claim 1, the step of reading comprising reading only wide-band pixel signals such that the narrow-band pixel signals remain unread.

20. The edge detection system of claim 10, the readout circuit being configured to, when generating the partially-filled reference image, read only wide-band pixels signals such that the narrow-band pixel signals remain unread.

* * * * *